United States Patent
Cavander et al.

(10) Patent No.: US 7,039,100 B2
(45) Date of Patent: May 2, 2006

(54) DETECTION OF CORRELATION BETWEEN DETECTED TRANSMISSIONS FROM MULTIPLE BASE STATIONS AND A KNOWN CODE IN A MOBILE TELECOMMUNICATIONS SYSTEM

(75) Inventors: Hans Cavander, Aspvägen (SE); Lars Lennartsson, Veberöd (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 658 days.

(21) Appl. No.: 09/993,569

(22) Filed: Nov. 27, 2001

(65) Prior Publication Data

US 2002/0191683 A1    Dec. 19, 2002

Related U.S. Application Data

(60) Provisional application No. 60/250,145, filed on Dec. 1, 2000.

(30) Foreign Application Priority Data

Nov. 27, 2000   (GB) .................................. 0028870

(51) Int. Cl.
*H04B 1/69*    (2006.01)

(52) U.S. Cl. ...................... 375/150; 375/145; 375/149; 370/342; 370/335

(58) Field of Classification Search ................ 375/150, 375/145, 149, 343, 365, 285, 298, 341; 370/342, 370/335, 324

See application file for complete search history.

(56) References Cited

U.S. PATENT DOCUMENTS

| | | | |
|---|---|---|---|
| 5,579,338 A | 11/1996 | Kojima | |
| 5,644,591 A | 7/1997 | Sutton | |
| 5,781,584 A * | 7/1998 | Zhou et al. | 375/150 |
| 5,910,948 A * | 6/1999 | Shou et al. | 370/335 |
| 6,167,037 A * | 12/2000 | Higuchi et al. | 370/335 |
| 6,185,244 B1 * | 2/2001 | Nystrom et al. | 375/145 |
| 6,208,632 B1 * | 3/2001 | Kowalski et al. | 370/335 |
| 6,363,105 B1 * | 3/2002 | Sourour et al. | 375/150 |
| 6,370,130 B1 * | 4/2002 | Zhou et al. | 370/335 |
| 6,385,232 B1 * | 5/2002 | Terashima | 375/149 |
| 6,507,576 B1 * | 1/2003 | Suzuki et al. | 370/342 |
| 6,807,224 B1 * | 10/2004 | Takahashi et al. | 375/150 |

FOREIGN PATENT DOCUMENTS

EP    0838910 A2    4/1998

(Continued)

*Primary Examiner*—Shuwang Liu
*Assistant Examiner*—Sudhanshu C. Pathak
(74) *Attorney, Agent, or Firm*—Potomac Patent Group PLLC

(57) ABSTRACT

A mobile station in a spread spectrum communications system includes a matched filter that can be divided into segments. On initial acquisition, when a frequency deviation between the expected receiving frequency of the mobile station and the transmitting frequency of the base station is expected to be relatively large, the device can operate in a first synchronisation mode, in which the filter is used divided into segments. On searching for alternative cells, when the frequency deviation is expected to be smaller, the device can operate in a second synchronisation mode, in which the filter is used undivided. Thus, in the first mode, a reduced filter length avoids the difficulties caused by frequency deviation, while, in the second mode, an increased filter length allows faster acquisition.

5 Claims, 3 Drawing Sheets

FOREIGN PATENT DOCUMENTS

| | | |
|---|---|---|
| EP | 0884856 A2 | 12/1998 |
| FR | 2748876 A1 | 11/1997 |
| JP | 9-51288 | 2/1997 |
| JP | 9-116522 | 5/1997 |
| JP | 9-321663 | 12/1997 |
| JP | 10-173632 | 6/1998 |
| JP | 10-200447 | 7/1998 |
| JP | 10-210004 | 8/1998 |
| WO | WO99/41846 | 8/1999 |
| WO | WO00/64066 | 10/2000 |

* cited by examiner

US 7,039,100 B2

DETECTION OF CORRELATION BETWEEN DETECTED TRANSMISSIONS FROM MULTIPLE BASE STATIONS AND A KNOWN CODE IN A MOBILE TELECOMMUNICATIONS SYSTEM

This application claims priority under 35 U.S.C. §§ 119 and/or 365 to 0028870.4 filed in the United Kingdom on Nov. 27, 2000 and to 60/250,145 filed in the United States of America on Dec. 1, 2000; the entire content of which is hereby incorporated by reference.

TECHNICAL FIELD OF THE INVENTION

This invention relates to a mobile communications device, and in particular to a device for use in a spread spectrum communication system.

BACKGROUND OF THE INVENTION

In a Wideband Code Division Multiple Access (W-CDMA) cellular radio telecommunications system, for example as used in so-called 3rd Generation mobile communications systems, a mobile station (MS) is able to move around an area in which multiple cells are defined. Each cell is served by a base station. The base stations use the same carrier frequency for their transmissions, and so these transmissions are identified by means of code signals which are transmitted by the base stations.

In order to establish a connection with a base station, a mobile station must go through an acquisition procedure. This requires that the mobile station be synchronised to the base station. This synchronisation is achieved by means of a matched filter. The maximum length of this filter is set by the frequency deviation which may exist between the base station and the mobile station, and so the length of the filter is restricted.

When the mobile station has established a connection with a base station, it must then continue to make measurements on signals received from other base stations. Again, the mobile station must synchronise to the other base stations before making these measurements. However, at this stage, the restricted length of the matched filter increases the time taken to synchronise to the base stations.

EP-0884856 describes a system of this type, in which the speed of acquisition is sought to be increased by using multiple matched filters.

SUMMARY OF THE INVENTION

The present invention relates to a spread spectrum communications system, in which a mobile station includes a matched filter which can be divided into segments.

In a first synchronisation mode, when a frequency deviation is expected to be relatively large, the filter is used divided into segments. In a second synchronisation mode, when the frequency deviation is expected to be smaller, the filter is used undivided. Thus, in the first mode, a reduced filter length avoids difficulties caused by frequency deviation, while, in the second mode, an increased filter length allows faster acquisition.

The first synchronisation mode can be used when the receiver is initially establishing a connection to a base station, while the second synchronisation mode can be used after a connection has been established, when detecting transmissions from other base stations.

According to another aspect of the invention, there is provided a method of controlling a receiver.

It should be emphasised that the term "comprises/comprising" when used in this specification is taken to specify the presence of stated features, integers, steps or components but does not preclude the presence or addition of one or more other features, integers, steps, components or groups thereof.

DETAILED DESCRIPTION OF PREFERRED EMBODIMENTS

Figure 1:
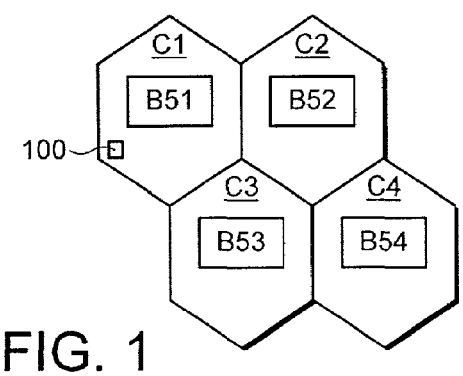
FIG. 1 is a schematic representation of a mobile communications network in accordance with the invention.

FIG. 1 shows a part of a cellular mobile communications network, operating in a Wideband Code Division Multiple Access (WCDMA) system. FIG. 1 shows just four cells C1–C4, although it will be realised that these represent only a small part of a typical network. Each of the cells C1–C4 includes a respective base station BS1–BS4. A typical mobile station (MS) 100 is also shown in the system. Again, it will be apparent that a real network will contain many such mobile stations.

Each base station BS transmits information to the mobile stations using the same nominal carrier frequency. These transmissions are spread using a Short Code. The mobile station is able to distinguish between the base stations because each base station also applies a respective Long Code to its transmissions. However, one part of each signal transmitted from a base station does not have the Long Code applied to it. This is the Long Code Masked symbol.

Although the invention is described herein with reference to a W-CDMA system, it will be apparent that it can be used in any system which uses a Long Code Masked symbol in this way, or, indeed, in any communication system in which a receiver must detect a code in a received signal.

When a mobile station 100 is switched on, it must establish a connection with one of the base stations. This requires it to synchronise to the transmissions from the base station. Firstly, the mobile station must detect the slot timings of transmissions from the base station. This is done by detecting the correlation between the known short code and a received signal, using a matched filter. Then, the long code can be detected.

A somewhat similar process carries on when a base station has been acquired. After acquisition, the mobile station detects transmissions from other base stations, to aid in determining whether it should handover communications to one of the other base stations. Similarly, the mobile station must detect the slot timings of transmissions from the other base station, by detecting the correlation between the known short code and a received signal using a matched filter. This allows the long code of the other base station to be detected.

Figure 2:
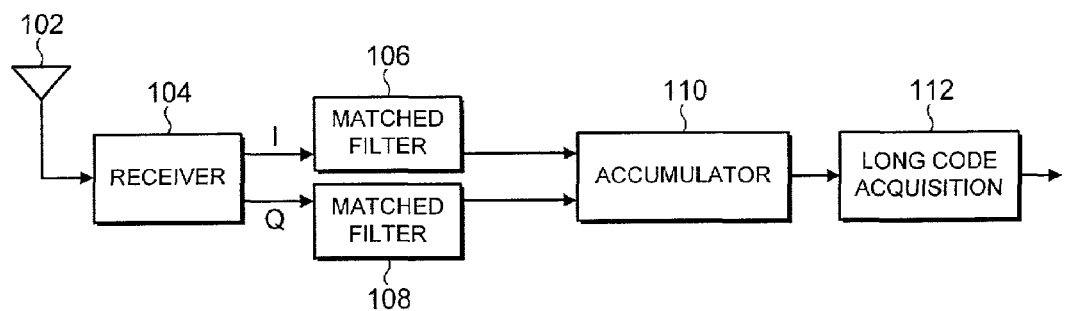
FIG. 2 is a block schematic diagram of a mobile communications device in accordance with an aspect of the invention.

FIG. 2 shows the relevant components of the mobile station 100. The invention is described herein with reference to a mobile phone, but it is generally applicable to portable radio communication equipment or mobile radio terminals, such as mobile telephones, pagers, communicators, electronic organisers, smartphones, personal digital assistants (PDAs), or the like. It will be apparent that FIG. 2 shows only those components of the mobile station 100 which are essential to an understanding of the present invention.

An antenna 102 detects radio transmissions from a base station BS. Front-end receiver circuitry 104 receives signals from the antenna 102, and provides suitably filtered digital sample streams for the in-phase (I) and quadrature (Q) components thereof. The sample streams representing the in-phase and quadrature components I, Q are passed to respective matched filters 106, 108. As discussed above, the matched filters 106, 108 detect the correlation between the known short code and the received signal components. Effectively, the filter slides over the signal stream received in a slot. Output filter values are supplied to an accumulator 110, which sums the output values. When it is determined that the accumulated value exceeds a threshold, it is determined that this filter position corresponds to the slot boundary. As will be described in more detail below, the operation of the matched filter is controlled by control circuitry of the mobile station.

The result of the determination by the accumulator 110 is passed to a block 112 which, by using the determined slot position, is able to detect the long code applied to the transmissions, and the result is then used in demodulating the received signal, as is known to the person skilled in the art.

Figure 3:
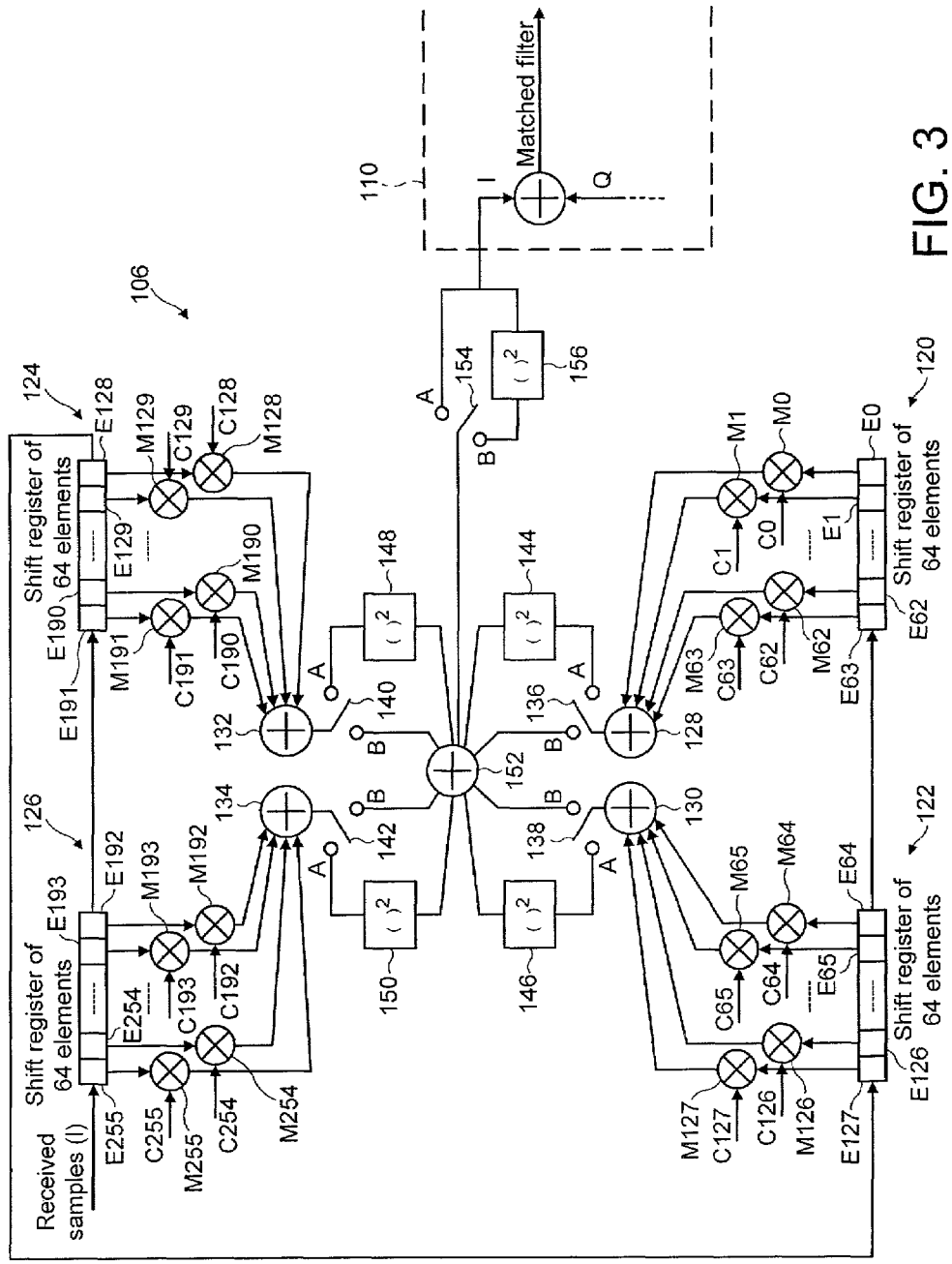
FIG. 3 is a block schematic diagram of a matched filter in the mobile communications device shown in FIG. 2.

FIG. 3 shows the form of the matched filter 106 which receives the sampled in-phase signal (I), although it will be noted that the form of the matched filter 108 which receives the sampled quadrature signal (Q) is the same.

The filter 106 includes a shift register comprising 256 elements En, which is shown for convenience divided into four blocks, each having sixty-four elements, namely a first block 120 made up of elements E0–E63, a second block 122 made up of elements E64–E127, a third block 124 made up of elements E128–E191, and a fourth block 126 made up of elements E192–E255. Input received samples are applied to element E255 and, as further samples are received, they in turn are applied to element E255, with previously received samples being shifted through the register. When 256 samples have been received, the first sample is in shift register element E0, while the most recently received sample is in shift register element E255.

At each stage, the value in each element En of the shift register is multiplied in a respective multiplier Mn by a corresponding coefficient Cn, which relates to a bit in the known short code discussed above. Thus, the value in element E255 of the shift register is multiplied in multiplier M255 by a coefficient C255, the value in element E254 of the shift register is multiplied in multiplier M254 by a coefficient C254, etc.

The outputs from the multipliers M0–M63 associated with the first block 120 of the shift register are summed in an adder 128, the outputs from the multipliers M64–M127 associated with the second block 122 of the shift register are summed in an adder 130, the outputs from the multipliers M128–M191 associated with the third block 124 of the shift register are summed in an adder 132, and the outputs from the multipliers M192–M255 associated with the fourth block 126 of the shift register are summed in an adder 134.

The outputs of each of the adders therefore represent the degree of correlation between the samples in the elements En of the corresponding shift register block, and the respective coefficient values Cn.

The outputs of the adders 128, 130, 132, 134 are connected to respective switches 136, 138, 140, 142 which can connect the respective adder outputs to respective alternative switch terminals A, B. The switch terminal A of each switch 136, 138, 140, 142 is connected to a respective block 144, 146, 148, 150, which squares its received value to measure the power thereof. The switch terminal B of each switch 136, 138, 140, 142 is connected to an adder 152, and the outputs of the blocks 144, 146, 148, 150 are also connected to the adder 152.

The output of the adder 152 is connected to a further switch 154, having alternative switch terminals A, B. The switch terminal A of the switch 154 is connected to the output of the filter 106, and then to the accumulator 110 (FIG. 2). The switch terminal B of the switch 154 is connected to a block 156 which squares its received value to measure the power thereof, and the output of the block 156 is also connected to the output of the filter 106, and then to the accumulator 110.

The operation of the filter 106, and the corresponding filter 108, will now be described in more detail with reference to FIGS. 4 and 5, which are flow charts illustrating the relevant parts of the synchronisation procedures carried out in the mobile station, under the control of control circuitry included in the mobile station.

Figure 4:
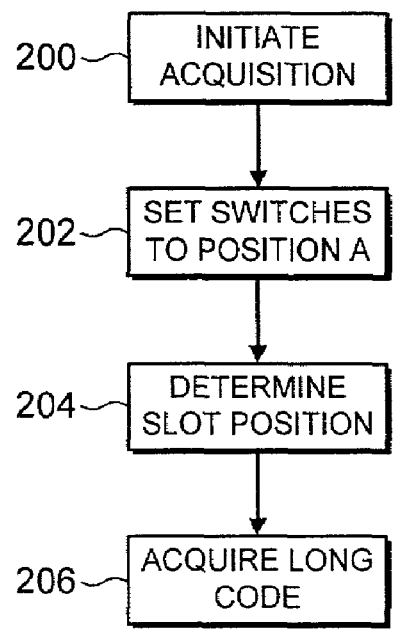
FIG. 4 is a flow chart showing a first synchronisation procedure in accordance with an aspect of the invention.

FIG. 4 shows the synchronisation carried out when the mobile station is switched on. Thus, in step 200, the acquisition procedure is started. In step 202, the switches 136, 138, 140, 142, 154 in the filter 106 shown in FIG. 3 (and the corresponding switches in the filter 108) are set to their respective positions marked A. The reason for this will be explained below.

In step 204, based on the accumulated results from the filters 106, 108, the slot synchronisation position is determined. Then, in step 206, the long code of the base station is determined, these latter steps, and the subsequent steps which will not be described further, being generally conventional.

Figure 5:
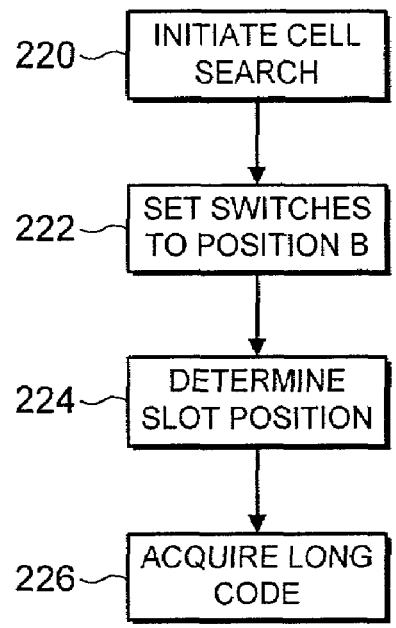
FIG. 5 is a flow chart showing a second synchronisation procedure in accordance with an aspect of the invention.

FIG. 5 shows the synchronisation carried out when the mobile station searches for transmissions from another base station. Thus, in step 220, the cell search procedure is started. In step 222, the switches 136, 138, 140, 142, 154 in the filter 106 shown in FIG. 3 (and the corresponding switches in the filter 108) are set to their respective positions marked B. Again, the reason for this will be explained below.

In step 224, based on the accumulated results from the filters 106, 108, the slot synchronisation position is determined. Then, in step 226, the long code of the base station is determined, these latter steps, and the subsequent steps which will not be described further, again being generally conventional.

When the mobile station is first switched on, there can be a relatively large frequency deviation, between the frequency at which the base station is transmitting, and the frequency at which the mobile station is expecting to receive transmissions, that is, the frequency at which samples are clocked through the shift register blocks 120, 122, 124, 126. This frequency deviation can for example be up to +/−10 ppm, that is up to about 20 kHz if the carrier frequency is 2 GHz. This frequency deviation results in a phase rotation in every sample of the received sample stream. Since the performance of the matched filter is degraded severely if the total phase rotation over the length of the matched filter is too high, this effectively sets an upper limit on the maximum length of filter that can be used.

In this embodiment of the invention, where the frequency deviation can for example be up to +/−10 ppm, the maximum filter length is set at 64 elements. Thus, with the switches 136, 138, 140, 142, 154 at the positions A, the four blocks 120, 122, 124, 126 effectively act as four separate filters, each with 64 elements.

In this case, assuming that each of the four blocks 120, 122, 124, 126 produces a correlation amplitude value X, when these are squared in the blocks 144, 146, 148, 150, and summed in the adder 152, the output accumulation value is $4X^2$.

When the mobile station has established synchronisation with one base station, and is performing a cell search operation, as described in FIG. 5, the frequency deviation should not exceed +/−1 ppm, because the crystal oscillator in the frequency generator of the mobile station can be suitably compensated. Therefore, during this phase of operation, the possible frequency deviation does not effectively set any upper limit on the maximum length of filter that can be used.

In this embodiment of the invention, the switches 136, 138, 140, 142, 154 are set at the positions B, and the four blocks 120, 122, 124, 126 effectively act as a single filter, with 256 elements.

In this case, assuming that each of the four blocks 120, 122, 124, 126 produces a correlation amplitude value X, when these are summed in the adder 152, and squared in the block 156, the output accumulation value is $16X^2$, compared with an output accumulation value of $4X^2$ when the four blocks 120, 122, 124, 126 effectively act as four separate filters. There is a corresponding increase of 6 dB in the signal-to-noise ratio of the output value.

If the slot boundary detection algorithm relies on accumulating the power from the matched filter until it reaches a threshold, then this increase in the output accumulation value allows the slot boundary to be found considerably more quickly.

This means that slot synchronisation can be achieved more quickly, that there is reduced power consumption because the algorithm runs for a shorter period, and hence that the battery life of the mobile station can be extended.

What is claimed is:

1. A receiver, for use in a telecommunications system in which transmissions are sent from a plurality of base stations, the receiver comprising:
   receiver circuitry, for detecting transmissions from base stations;
   a filter, for detecting a correlation between detected transmissions from base stations and a known code, the filter including a plurality of filter segments;
   control circuitry, for switching the filter between a first synchronization mode, in which the filter is used divided into segments, when the receiver is first detecting transmissions from a base station to achieve synchronization therewith, and a second synchronization mode, in which the filter is used undivided, when the receiver is synchronized with one base station and is detecting transmissions from an alternative base station; and
   means for detecting a power of a correlation between detected transmissions from base stations and a known code,
   wherein, in the first synchronization mode, the powers of the correlations of the filter segments are detected and added together to form an output value, and, in the second synchronization mode, the correlations of the filter segments are added together and the power of the added correlations is detected, to form an output value.

2. A receiver as claimed in claim 1, for use in a CDMA telecommunications system, wherein the filter detects a correlation between Long Code Masked symbols transmitted from base stations and the known code.

3. A method of controlling a receiver, for use in a telecommunications system in which transmissions are sent from a plurality of base stations, the method comprising:
   detecting transmissions from base stations;
   using a filter, for detecting a correlation between detected transmissions from base stations and a known code, the filter including a plurality of filter segments;
   switching the filter between a first synchronization mode, in which the filter is used divided into segments, when the receiver is first detecting transmissions from a base station to achieve synchronization therewith, and a second synchronization mode, in which the filter is used undivided, when the receiver is synchronized with one base station and is detecting transmissions from an alternative base station; and
   in the first synchronization mode, detecting the powers of the correlations of the filter segments and adding them together to form an output value, and, in the second synchronization mode, adding together the correlations of the filter segments and detecting the power of the added correlations, to form an output value.

4. A method as claimed in claim 3, for use in a CDMA telecommunications system, wherein the filter detects a correlation between Long Code Masked symbols transmitted from base stations and the known code.

5. A method as claimed in claim 3, further comprising detecting a synchronisation position of the transmissions based on the output value.

* * * * *